C. W. HAM.
SPRING WHEEL.
APPLICATION FILED APR. 1, 1912.
1,055,742.
Patented Mar. 11, 1913.
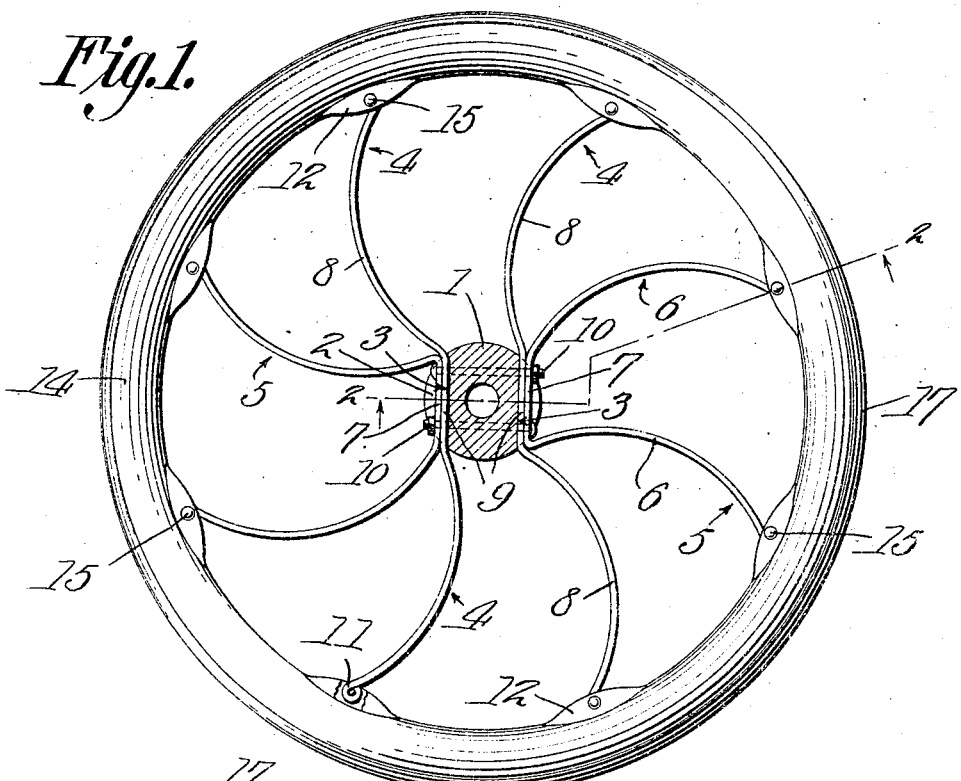
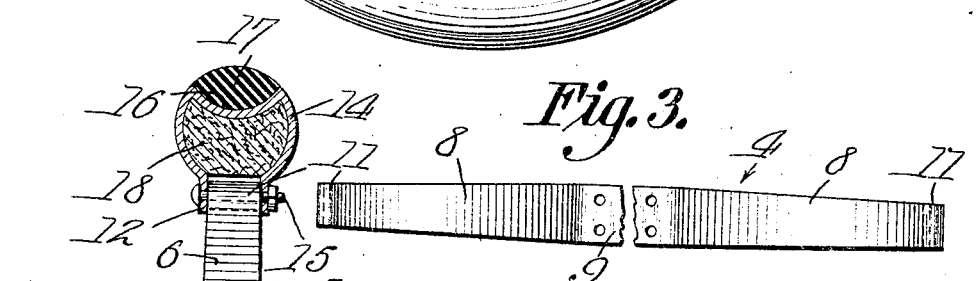
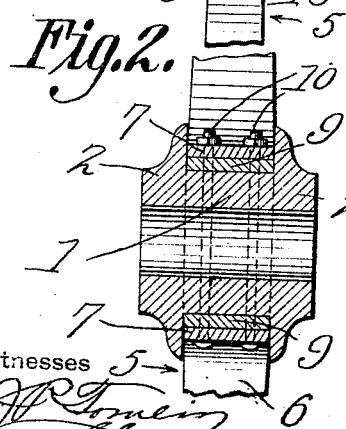
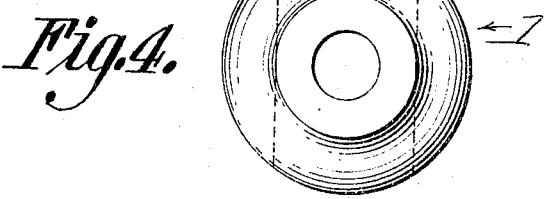
C. W. Ham, Inventor.

UNITED STATES PATENT OFFICE.

CHARLES W. HAM, OF MEMPHIS, TENNESSEE.

SPRING-WHEEL.

1,055,742.

Specification of Letters Patent. Patented Mar. 11, 1913.

Application filed April 1, 1912. Serial No. 687,679.

*To all whom it may concern:*

Be it known that I, CHARLES W. HAM, a citizen of the United States, residing at Memphis, in the county of Shelby and State of Tennessee, have invented a new and useful Spring-Wheel, of which the following is a specification.

One object of the present invention is to provide a series of primary and secondary spring spokes of novel and improved form adapted to coöperate in a novel manner with the hub and with each other to form a resilient support for the rim.

A further object of the invention is to provide a novel form of rim for use in a wheel of the character hereinafter described.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows in side elevation, a wheel constructed in accordance with the present invention; Fig. 2 is a section upon the line 2—2 of Fig. 1; Fig. 3 is an elevation of one of the primary spokes; and Fig. 4 is an elevation of the hub.

In carrying out the invention there is provided a hub 1 provided with flanges 2, there being oppositely disposed, flat bearing areas 3 upon the hub 1 between the flanges 2.

The invention further includes a pair of resilient primary spokes denoted generally by the numeral 4. Each resilient primary spoke 4 includes a flat intermediate portion 9 and oppositely extended arms 8 which are curved in opposite directions.

The invention further includes a pair of arched secondary spokes 5, each spoke 5 comprising a straight intermediate portion 7 and arms 6 which are curved in a common direction.

All of the arms of the several spokes terminate in eyes 11, whereby the extremities of the arms of the spokes are assembled with the rim in a manner hereinafter to be described. The intermediate portions 9 of the primary spokes 4 are applied to the flat bearing areas 3 of the hub 1, and the straight intermediate portions 7 of the secondary spokes 5 are applied to the straight intermediate portions 9 of the primary spokes, as will be clearly understood, from an inspection of Fig. 1. Retaining elements, preferably taking the form of bolt and nut structures 10 are extended through the hub 1 into the intermediate portions 9 and 7 of the spokes, to hold the spokes assembled with the hub.

The rim of the wheel is a composite structure and comprises a tubular casing 14 provided with inwardly extended ears 12 between which the eyes 11 of the spokes register, pivot elements 15 being passed through the eyes 11 and through the ears 12. In the tread of the casing 14, a concaved seat 16 is formed, and in the seat 16 registers a double convexed tire 17 which is preferably fashioned from rubber. Owing to the concavity of the seat 16 and owing to the convexity of the tire 17, a lateral movement of the tire 17 upon the casing 14 will be avoided. Furthermore, owing to the construction above outlined, the circular transverse contour of the rim is maintained. The interior of the casing 14 is packed with a filling 18 which is preferably fashioned from paper pulp.

It will be seen that the construction of the wheel is such that the spokes 4 and 5 may be assembled readily with the hub 1. Owing to the curvatures of the arms of the several spokes, the wheel is given a symmetrical form, and owing to the different shapes of the spokes, and owing to the manner in which they coöperate with one another and with the hub, a wheel of unusual strength at the hub is provided, the wheel having, beyond the hub, the desired resiliency. The arms 8 of the primary spokes 4 extend away from the hub in approximate alinement, and the arms 6 of the secondary spokes 5 extend away from the hub in approximate parallelism. Owing to the fact that the secondary spokes 5 are of arched form and are assembled with the intermediate portions of the primary spokes 4 and with the hub 1, the secondary spokes 5 serve to receive a portion of the weight, when the wheel is positioned as shown in Fig. 1, thereby equalizing the strain upon the wheel and distributing the resiliency thereof. The device herein disclosed is of few parts, and the construction is such that the wheel may be set up and knocked down with a minimum amount of labor.

Having thus described the invention, what is claimed is:—

1. A wheel comprising a hub; resilient primary spokes having their intermediate portions applied to opposite faces of the hub, the primary spokes terminating in arms projecting in opposite directions beyond the hub; secondary resilient spokes of arched form and comprising intermediate portions, and arms projecting in a common direction from the hub, the intermediate portions of the secondary spokes being applied to the intermediate portions of the primary spokes; means for securing the intermediate portions of both sets of spokes to the hub; and a rim carried by the spokes.

2. A wheel comprising a hub; resilient primary spokes having straight intermediate portions applied to opposite faces of the hub, each spoke terminating in arms projecting in opposite directions beyond the hub and curved in opposite directions; secondary resilient spokes of arched form and comprising straight intermediate portions and curved arms projecting in a common direction from the hub and curved in a common direction the intermediate portions of the secondary spokes being applied to the intermediate portions of the primary spokes; means for connecting the intermediate portions of both sets of spokes with the hub; and a rim carried by the outer ends of the spokes.

3. A wheel comprising a hub; resilient primary spokes having their intermediate portions applied to opposite faces of the hub, the primary spokes terminating in arms projecting in opposite directions beyond the hub and curved in opposite directions; secondary resilient spokes of arched form and comprising intermediate portions and arms projecting in a common direction from the hub, the arms being curved in a common direction, the intermediate portions of the secondary spokes being applied to the intermediate portions of the primary spokes; means for securing the intermediate portions of both sets of spokes to the hub; and a rim carried by the spokes.

In testimony that I claim the foregoing as my own, I have hereto affixed my signature in the presence of two witnesses.

CHARLES W. HAM.

Witnesses:
H. C. BAILEY,
HARRY J. FITZGERALD.